United States Patent [19]

Johnson

[11] Patent Number: 4,825,620

[45] Date of Patent: *May 2, 1989

[54] STRUCTURAL SUPPORT OF INTERLOCKING LATTICE CONSTRUCTION

[76] Inventor: David W. Johnson, 1884 Sunset Blvd., San Diego, Calif. 92103

[ * ] Notice: The portion of the term of this patent subsequent to Dec. 29, 2004 has been disclaimed.

[21] Appl. No.: 137,100

[22] Filed: Dec. 23, 1987

Related U.S. Application Data

[63] Continuation-in-part of Ser. No. 848,573, Apr. 7, 1986, Pat. No. 4,715,503.

[51] Int. Cl.⁴ ............................................. E04H 12/18
[52] U.S. Cl. ........................................ 52/646; 52/648; 211/189

[58] Field of Search .................... 211/74, 189, 105, 85, 211/182; 403/219, 364; 446/106; 273/160; 52/667, 646, 648; D6/467; D7/71

[56] References Cited

U.S. PATENT DOCUMENTS 4,715,503  12/1987  Johnson .................................. 211/74

Primary Examiner—Blair M. Johnson
Attorney, Agent, or Firm—Ralph S. Branscomb

[57] ABSTRACT

A structural support is formed from a lattice which is elongated in the direction representing the run of the structural support, and of much smaller dimension such as being two lattice joints across in its other dimensions, with the joints defining the lattice being of a special interlocking construction which creates a quite rigid joint in all dimensions of possible movement without the use of any fasteners or adhesive.

14 Claims, 3 Drawing Sheets

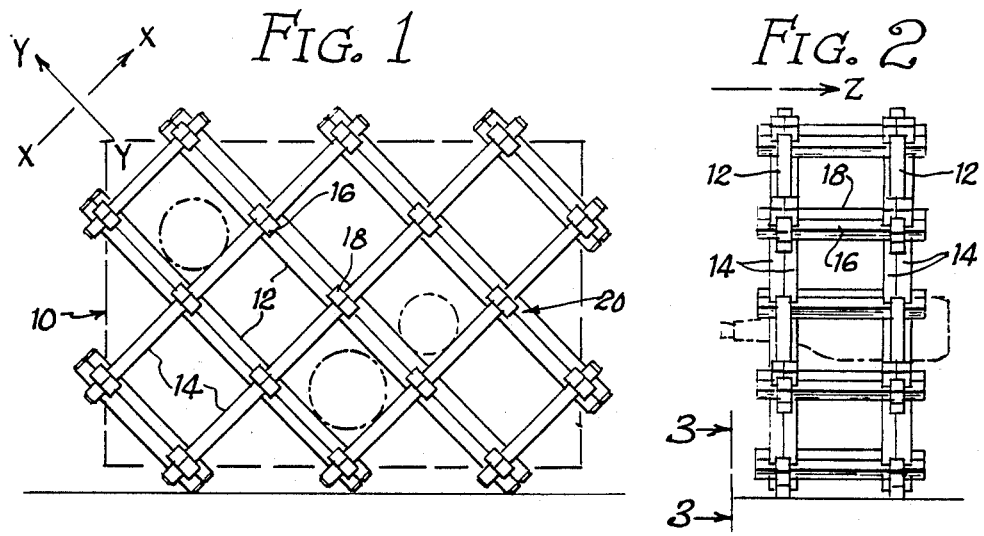
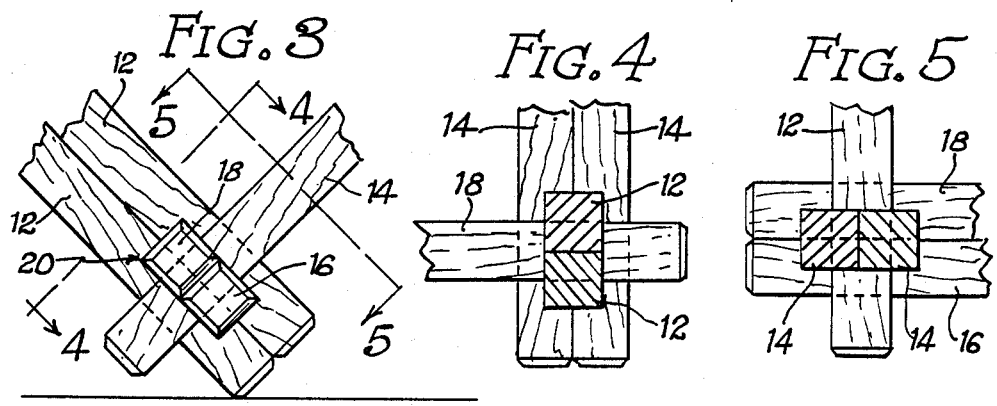
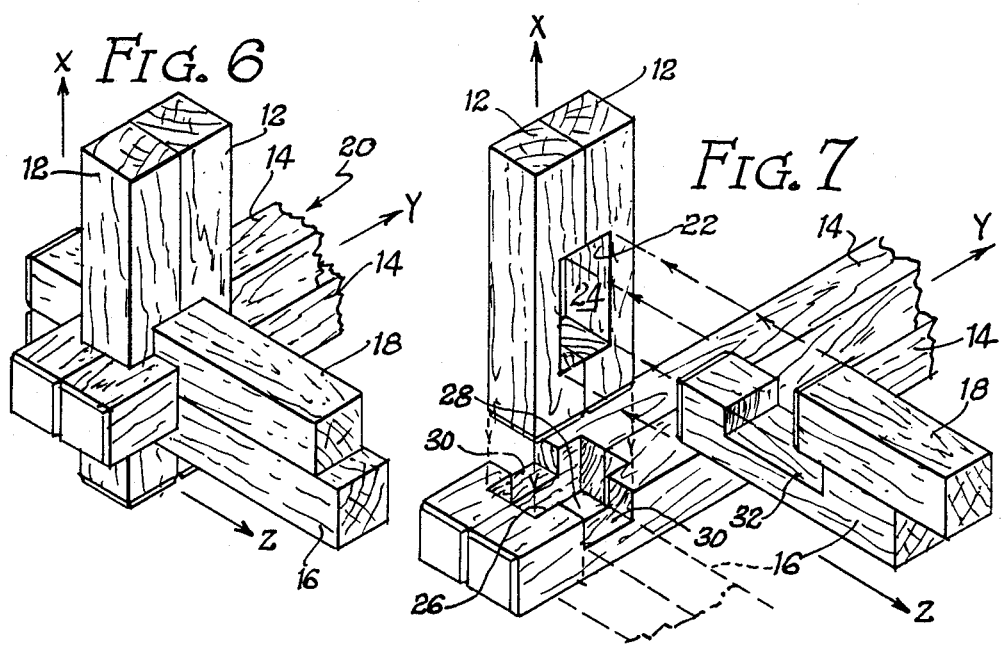

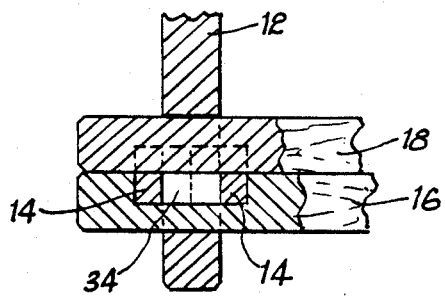
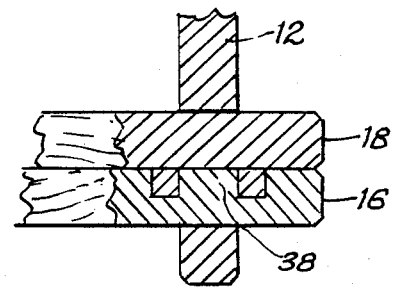
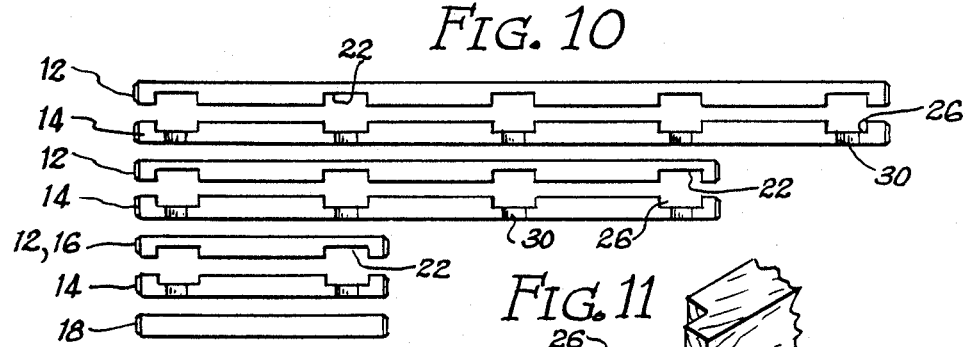
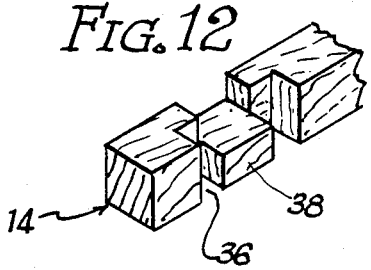
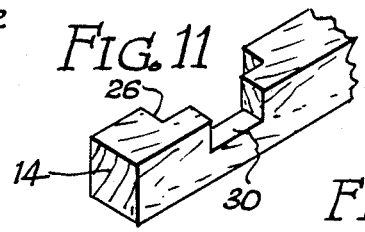
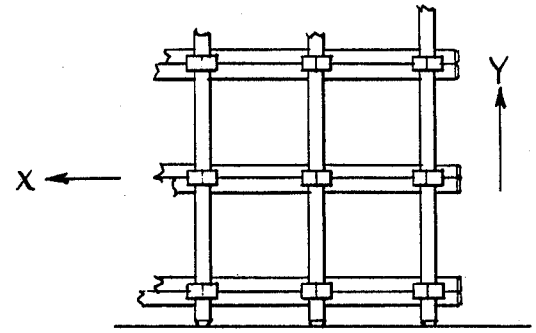

STRUCTURAL SUPPORT OF INTERLOCKING LATTICE CONSTRUCTION

BACKGROUND OF THE INVENTION

The instant invention is a Continuation in Part Application of Application Ser. No. 848,573, filed 04/07/86, which issued into U.S. Pat. No. 4,715,503, issued Dec. 29, 1987, to David W. Johnson, for an INTERLOCKING JOINT WINE RACK.

The parent application to this case described a lattice constructed of interlocking joints utilizing no fasteners or adhesives which was described as being generally applicable to a variety of different structures, but was specifically claimed as a wine rack.

The instant invention extrapolates the basic construction of the wine rack into a structural support such as a beam, girder, or post which is used not for its attractive appearance or its ability to hold objects, but for its strength, and more specifically for its high strength-to-weight ratio.

The peculiar nature of this lattice structure had its genesis in the joint, each of which joint is the same as each of the other joints. The joint is fabricated from six members, there being two contiguous members running in each of the three physical dimensions, with the result that a very rigid joint is produced which resists all twisting, turning and bending movements in all dimensions.

The great advantage of this joint lies not in the fact that its use saves fasteners and adhesives, but rather in the fact that it can be constructed out of identical elongated members which differ from one another only in the notches that are cut in them, there being three different configurations of the member at the joint area, one of which is full-notched, the second of which is both full-notched and half-notched, and the third of which has no notches at all.

Therefore, the construction naturally lends itself to the use of materials which may have great structural strength but which may be difficult, according to today's technology, to bond together to create structural members more complex than straight runs without sacrificing strength.

For example, the nature of steel is such that a weldment between two steel members, if performed correctly, is as strong as the metal itself. However, this is not true of aluminum, which can be welded but producing a satisfactory weldment is often very difficult. This is also not true of Nylon and many other forms of plastic which are quite tough and structurally strong, but must be used in their originally extruded shape, as a general rule, because more complex shapes achievable by bonding will partially lose the original strength advantage of the material because of the weakness at the bonding points. Whether this will be true in the future is, of course, not known as more adhesives are created and improved fabrication techniques are discovered, but it is certainly the case at this point in time.

Because of the nature of the joint construction of the lattice described in the structural member of the instant invention, however, any material which may be formed by an extrusion and then subjected to the milling of notches, such as Nylon, aluminum, and just about any plastic, can be fabricated into a lattice of virtually any desired length, width and height dimension with any number of joints without requiring welding or bonding whatsoever. This is true also for other materials including wood.

For this reason, virtually any high strength material that is light in weight can be assembled into trussed beams with an enormous strength-to-weight ratio. Additionally, assembling of very long beams can be done at construction sites using unskilled labor with no special tools.

Beams made from the lattice construction display a remarkable strength-to-weight ratio. In applications such as aerospace and transportation, in which strength-to-weight is very important, the lattice beam can be a replacement for steel beams and I-beams typically used today. Aircraft and road applications such as for truck-trailer beams are typical examples.

The thickness of the member material, and the distance between joints, and length of the overall structural member can be varied to create an infinite number of combinations of rigid trussed beams for application such as roof supports, glass table top supports, and even frame supports for buildings and cargo carrying vehicles.

SUMMARY OF THE INVENTION

The lattice which comprises the elongated structural member of the instant invention in the preferred embodiment is two joints wide in its width and depth dimension, and in the other length dimension is as long as is necessary. The joints are described in more detail in the Detailed Description, but basically constitute six members in three two-member pairs, the members in each pair being adjacent and parallel. The members in the first pair have facing notches cut that together define the cross-sectional area of two of the members, and in the second pair a notch identical to those notches in the first pair are created and another, additional notch is cut at a 90 degree angle into the first notch and is half as wide as the first notch, and the last pair of members consists of one member which has no notches at all, and another member which has a full notch as the first pair. A minor variation of this construction is disclosed in which there are no voids created in the assembled joint, as a small void is created by the above-described configuration.

Once the joint is understood, the beam itself can be comprised of individual members which are elongated in any direction, which is a useful feature, for example, if one were to want to make the beam somewhat deeper than it is wide for increased strength-to-weight ratio. The additional depth may be with the addition of more joints, or it may be by use of only the two original joints.

As any dimension, particularly the length, needs to be increased beyond the length of the longest individual member, the members can be pinned together as will be described below, preferably at staggered spans of the beam configuration, so that an indefinite length can be created with virtually no loss in strength.

BRIEF DESCRIPTION OF THE DRAWINGS

FIG. 1 is a front elevation view of a wine rack made from the lattice construction;

FIG. 2 is a side elevational view of the wine rack of FIG. 1 illustrating a bottle of wine as it would rest in the rack;

FIG. 3 is a front elevational view of a typical bottom joint of the rack and of the lattice in general;

FIGS. 4 and 5 are sections taken respectively along lines 4—4 and 5—5 of FIG. 3;

FIG. 6 is an isometric view of a typical joint;

FIG. 7 is an exploded view of the joint illustrated in FIG. 6 making it possible to understand how the members interlock to form the joint;

FIG. 8 illustrates the internal void of the joint utilizing the preferred method of construction;

FIG. 9 is identical to FIG. 8, illustrating the way in which the internal void is filled by utilizing slats of the modified version illustrated in FIG. 12;

FIG. 10 is a plan view illustrating the three different sizes and types of pieces used in construction of the wine rack;

FIG. 11 is an isometric view of the notched area of a typical slat;

FIG. 12 is an isometric view of a modified slat with an E-type configuration so that the internal void of the joint is filled as shown in FIG. 9;

FIG. 13 illustrates the lattice construction as it would appear if it rotated 45 degrees as illustrated in FIG. 1 for a wine rack;

DETAILED DESCRIPTION OF THE PREFERRED EMBODIMENT

Figure 14:
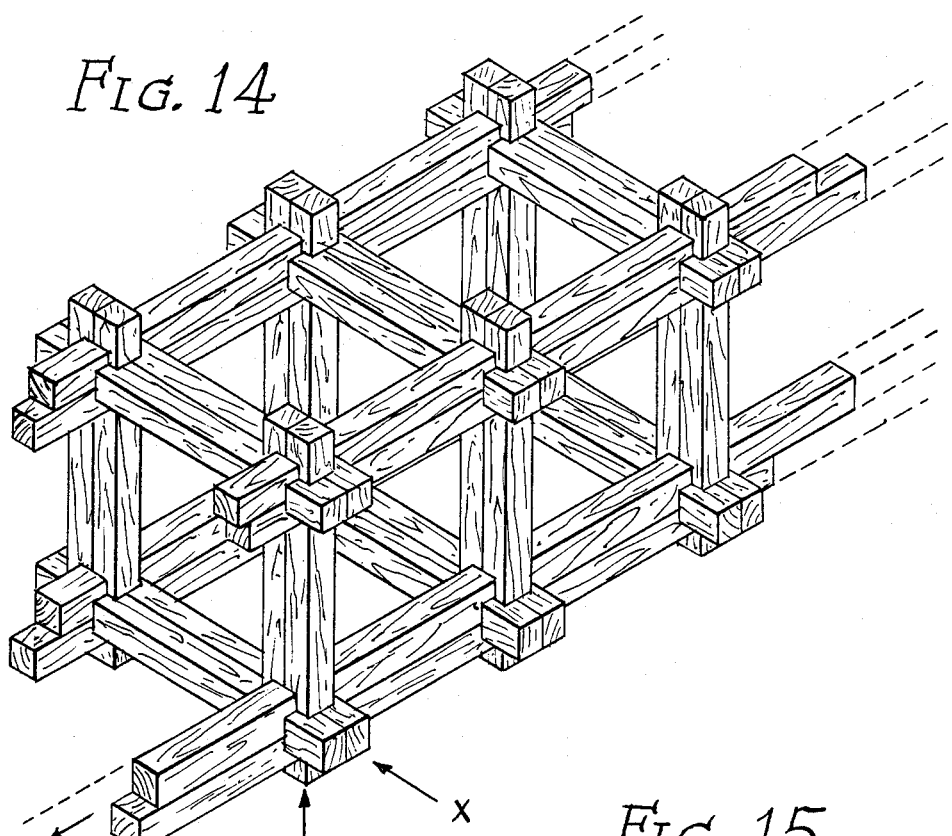
FIG. 14 is a portion of a beam in isometric illustrating its orientation and the way it is extended from the basic lattice construction to define a beam.

The three dimensional lattice is best understood by labeling the directions in which the various members extend in a wine rack, so as indicated in FIG. 1, the X and Y axes align with the directions that the members extend that define the front of the wine rack, and the depth is established by the Z direction, indicated in FIG. 2. The same type of construction could clearly be used in a similar structure illustrated in FIG. 13 as it generally would be when used as a structural member, in which the matrix is upright, rather than being tilted 45 degrees as in FIG. 1. The configuration of the wine rack of FIGS. 1 and 2, is such that, as it is made tilted 45 degrees from the upright as shown in FIG. 12, all peripheral joints of the wine rack align with the sides of the rectangle, illustrated in part at 10.

The lattice of the rack is defined from only four different types of members in the preferred embodiment. Although they are all similar pieces of hardwood rectangular millstock, sanded, polished and finished to produce a fine piece of furniture, in order to clarify the explanation and description, the members are given arbitrary distinguishing names which correspond with the above-mentioned directions in three dimensions in which the members run. Members running in the X direction are called "laths," and are indicated at 12, "slats" 14 run in the Y direction, and "posts" 16 and 8 run in the Z direction (there are two different kinds of posts).

All of the joints 20 are identical, in the configuration, orientation and cutting of the members that define the joints. Thus, to understand the construction of the unit, first the construction of a single joint will be described, and then the organization of lattice as illustrated in the wine rack as a whole will be set forth, and then construction of the structural support is described.

Turning to FIG. 7, the basic element of the X direction is the lath 12, and two of these laths together form the structural member that extends in the X direction. In the claims, the laths are defined as "elongated structural members," as are the slats.

The two laths in FIG. 7 each has what is referred to as a "full notch 22," this terminology referring to a notch, which when paired with an oppositely directed notch, as shown in FIG. 7 defines a passthrough opening 24 for a pair of members which will snugly fit into the opening when inserted orthogonally therethrough. This opening is referred to as a "Z-passthrough opening" in the claims, because the opening will pass through members which run in the Z direction.

Still referring to FIG. 7, the slats 14 running in the Y direction also have full notches 26 which define a X-passthrough opening 28, through which passes the pair of laths 12, indicated exploded away from the opening in FIG. 7. The slats 14 also each have a half-notch 30, which is half the width of the full notch 22. The half-notches 30 are orthogonally related to the main notches 26 and are midway located in the full notch and define a pass through opening in the Z direction.

Finally, the post 16, extending in the Z direction, has a full notch 32. The other post 18', which is the "key" post, is not notched at all, but is a straight piece of square millstock.

The way in which the members fit together to form the joint is as follows: The laths 12 are inserted down through the opening 28 (or in actuality, the slats 14 are placed around the laths so that the opening 28 embraces the laths), so that the opening 24 defined by the laths extends down sufficiently below the opening 28 of the slats to permit the post 16 to be slid into the opening 24 beneath the slats 14. With the slats 14 compressed together, they are then fitted down into notch 32 of the post 16, so that the notch 32 embraces the two laths 14 and holds them together. The post 16 would then extend from the slats 14 as indicated in phantom in FIG. 7.

Thus, there is nothing left but a straight Z-passthrough opening for the "key" post 18 to fit into as shown in FIG. 7. Once the key post is in place, the slats 14 can no longer be raised to release the underlying post 16', and thus there is a locked, rigid orthogonal joint. Conversely, by slipping out the key post 18 (which in the preferred form of the invention makes a very tight press fit), the slats 14 can be lifted up out of the notch 32, to permit the post 16 to be slid longitudinally out of the opening 24, freeing the slats and laths to be separated.

Turning now to the overall construction, the matrix illustrated in FIGS. 1 and 2 is formed from an X-directional parallel array of laths, a Y-directional parallel array of slats, and a Z-directional parallel array of posts.

There are only two type of cuts that need to be made in any of the structural members of the lattice. First, the full-sized notch cut, which is made in all the members except for the key post 18. Second the half-notch, which is made after the full-sized notch is made in the slats and in the post 16. With the proper jigs and tooling, obviously these cuts can be very simply and economically made.

The pieces used to construct the wine rack are illustrated in FIG. 10. For each length dimension, the lath has its exact counterpart as a slat. There are thus four of the large laths and slats, eight of the middle-sized laths and slats, and eight of the small laths and slats. And, as can be seen by counting the butt ends of the post from FIG. 1, there are seventeen of each of the posts 16 and 18. However, because the shortest laths are identical to the posts 16 in the wine rack example, there would just be a combined total of 25 of those.

In constructing the rack, although obviously it can be done by hand, a simple way utilizing a framing jig involves first laying out all the laths (X direction) in place for the entire wine rack, possibly with the rack in its upright position as shown in FIG. 13. Then the slats 14 are all put in place, or put in place slightly displaced from their final position to permit the insertion of the posts 16. The, the posts 16 are slid in place and the respective slats 14 pressed into place in the notches 32 of the posts. Finally, nothing remains but to slide all seventeen of the key posts into place.

When the joint is completed, there is a void 34 which is defined by the bottom parts of the openings 28 and 24, beneath the solid key post 18 and between the sides of the slats 14 adjacent the half-notches. To eliminate this void, the slats could be cut as shown in FIG. 12, with the otherwise full-notch 22 instead being defined by an E-cut 36, which leaves a tongue of wood 38, two of which fill the void 34. This results in a somewhat stronger joint.

In addition to the E-cut 36 in the slat, there are other configurations which would result in the internal void being filled, which will not be expanded upon here.

In either of the joint embodiments illustrated, the wine rack of the instant disclosure, as indicated above, is very complex in its conception, at least for a wine rack, but is at the same time conceptually extremely simple in its implementation. When made from oak or other hardwood, it can be finely milled and finished to produce a very strong structure as well as a very attractive piece of furniture which appears to be of relatively intricate construction for the price. At the same time, it is extremely strong and durable, capable of loads, wall mounting, etc. The prototype wine rack, made of three-quarter inch nominal dimension soft wood, will withstand the full weight of a person standing on it without any sign of distortion or weakening. In fact, the construction is so strong that the same basic construction can be used to form structural members as described below.

By increasing the six of the members —for example, from three-quarters inch nominal stock in the model to six-inch or eight-inch square beams —large, strong cubicle frames or non-cube shaped box-like spaces, could be defined for an endless variety of uses. FIG. 13 illustrated the basic modular cubic construction that would expand into a variety of useful lattice structures. The stock need not be square, but could be rectangular instead. Additionally, the cubes formed by the stock could be rectangular rather than cubic in two or three dimensions, or the cubic units could be parallelograms rather than cubic or rectangular. Although in some instance strength could be sacrificed, and the interchangability of the stock would be sacrificed, nonetheless for certain applications diamond-shaped or rectangular "cubes" might work out quite well.

By extending members of the six-piece orthogonal joint and then forming additional joints, all with common members, complex arrays can be created. If eight joints are used to form the orthogonal corners of a cube, then a very practical structure, with many potential uses is created. This cubic cell is rigidly bound together and a force applied to one member creates stresses which are shared by all members. By extending members and adding four joints, a second cubic cell can be formed alongside the first which shares four joints with the first cubic cell. Similarly, a third cubic cell can be formed by adding four joints and sharing four joints with the second cell.

Figure 15:
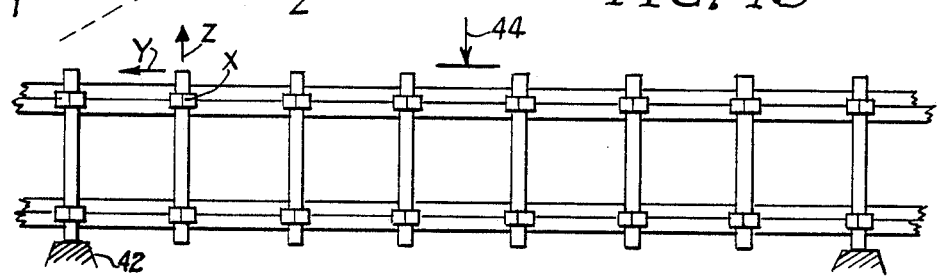
FIG. 15 is a side elevation view of a typical beam of a typical length-to-width ratio; and, FIG. 16 illustrates a beam that is deeper than it is wide, and illustrates the pinning of contiguous butted lengths of the member to form the length dimension of any dimension desired.
Figure 16:
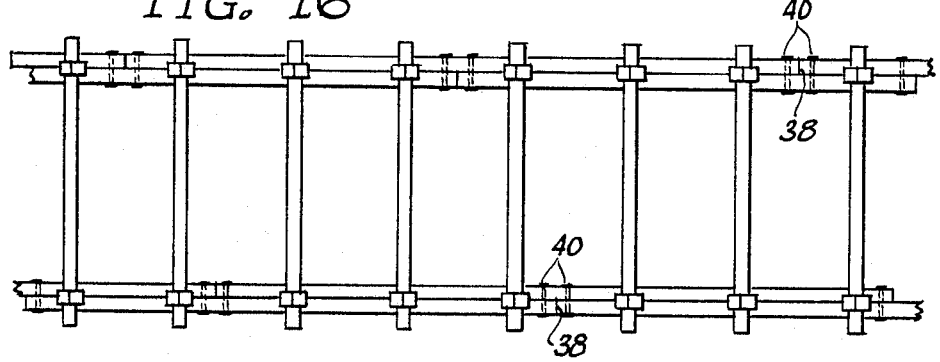

In this way, a beam can be formed with structural properties similar to a solid beam, but much lighter as illustrated in FIGS. 14 through 16. Thus, applications include assembly of high strength materials into cubic cell arrays and forming equivalent beams or truss-like formations for structural use where maximum strength with minimum weight is a design criterion. Another advantage is that the strength of these arrays is not dependent on conventional welding techniques currently used with today's materials. This permits the use of materials which are not adapted to welding techniques, such as certain tough plastics, to be made into beams and other strong multicellular configurations according to the instant disclosure.

FIG. 14 is a segment of an elongated beam, which might be, for example, eight cells long and one cell deep by one cell wide. FIG. 15 is a side elevation view of the same construction. Although any orientation of the slats, laths and posts would logically work, logically the beam should be assembled so that the longitudinal members are double vertical thickness, one above the other as shown in FIGS. 14 through 16, rather than being side by side as would be the case if the beam were extended in the X, lath direction, rather than the Y, slat direction.

As shown in FIG. 13, a beam made according to this construction could be three joints deep and an indefinite number of joints long, and only two joints wide. Or, as shown in FIG. 16, each of the cells of the beam or structural member can be deeper than it is wide, about twice as deep in the illustration of FIG. 16. This would create additional strength without much additional weight. This differs from the construction of FIG. 13 in that it is only two joints deep, and eliminates the added longitudinal members in the center of the FIG. 13 construction.

The thickness of FIG. 16 is not shown, and could actually be any thickness desired. Naturally, the more of the dimensions are uniform the fewer different parts are needed and the simpler will be the assembly.

FIG. 16 also illustrates the way in which the beam can be assembled to an indefinite length. The slats which define the elongated dimension of the beam can be butted up against each other to define butt-joints illustrated at 38 in FIG. 16, which could be left alone, or pinned at 40 to the adjacent structural member for added strength. Because there are eight slats in the beam, that is eight of the members run in the lengthwise direction, as long as the beam has at least eight joints per unit of length of the slats, it need not have more than one butt-joint in each of the cells. The joints can be staggered, one in each successive cell, until the full eight joints could be staggered, with one butt-joint at each successive cell until all of the slats are replaced by new slats, with the sequence repeated as necessary causing almost no reduction in strength.

Also, it would ordinarily seem desirable to have the posts in either the Z direction running vertically, or transversely of the beam rather than running longitudinally. Otherwise, it would have to be pushed through all of the joints in which it is a part to finalize the construction. Clearly, this could be difficult if there were eight or more joints to be pushed through, and could necessitate the creation of tolerances greater than necessary for pushing the final key members through just two joints.

According to this construction, when the beam is put on piers 42, as shown in FIG. 15, with a downward pressure being applied centrally as at 44, a surprisingly great force can be applied with little deflection of the beam member, and a quite enormous force can be applied before there is actual breakage.

Because in a typical beam stressed in such a manner, the top part of the beam is compressed and the bottom surface is stretched, in the instant case, the top slats are compressed and the bottom slats are stretched. The rigid nature of the joints prevents any distortion, or almost any distortion, of the shape so that the typical weakness generated by twisting distortion in a box beam is eliminated.

Although the structural support is illustrated as a beam or girder, it could easily be used as an upright post, in the nature of either a support for any kind of building structure, or for a broadcasting tower or the like. This would involve no modification of the structure but rather upending of a typical beam configuration illustrated in FIGS. 14 and 15.

In any orientation or with any of the modifications, a beam, girder, joist or post made according to the instant lattice construction will not only define a quite high strength-to-weight ratio for any material, but will permit the construction of structural members from a wide variety of materials henceforth unavailable for such construction due to the inability to weld or bond the material to itself in truss-type construction.

I claim:

1. A structural support comprising:
   (a) A reticulated lattice defining orthogonal X, Y, and Z directions;
   (b) said lattice being comprised of a plurality of elongated structural members formed into an X-directional parallel array, a Y-directional parallel array, and a Z-directional parallel array;
   (c) said parallel arrays intersecting one another to define joints between said elongated structural members and each of said joints including two of said members from each said X-, Y-, and Z-directional parallel arrays to form said six-member joints, said six-member joints each having three elongated structural members that are only full notched, said full notch being substantially equal to two times the cross-sectional area of each of the three elongated members, two of said members having similar full notches and also having an additional half notch, said half notch being formed at 90 degrees to the full notch and substantially at midspan of the full notch, the sixth elongated structural member having no notches at said joint and being the key post that holds the remaining five members together as a joint;
   (d) each of said joints comprising an interlocking joint held together by the interlocking configurations of the elongated structural members themselves such that said lattice is rigid and completely integral without the use of blocks or sockets at the joints; and
   (e) said reticulated lattice being substantially elongated in one of said directions compared to the other directions, and having substantially more joints in the direction in which it is elongated that in the other directions, such that it defines an elongated member dimensioned to be a structural support such as a beam, girder or post.

2. Structure according to claim 1 wherein each of said elongated structural members is paired with another contiguous structural member to define structural member pairs.

3. Structure according to claim 2 wherein each of the elongated structural members in said X-directional array comprises a lath and each lath is one of said elongated members which has a full notch at each joint with the notches facing one another to define a Z-passthrough opening.

4. Structure according to claim 3 wherein each of the elongated structural members in said Y-directional array comprises a slat and each slat has a full notch at each joint with the notches of the slats facing each other to define an X-passthrough opening, and said laths pass through said openings.

5. Structure according to claim 4 wherein each said slats has a half-notch cut centrally orthogonally in the side of each of the notches thereof, and said half-notches define Z-passthrough openings, and each of the elongated structural members of the elongated structural member pairs of the Z-directional array comprises a post, a first one of the posts in each pair having a full notch at each joint defining a wide passthrough opening embracing two of said slats in alignment with the half-notches thereof, and the second post of each pair being a key post with no notches, inserted into the joints last to rigidly tie the respective joint together.

6. Structure according to claim 5 wherein some of said elongated structural members having notches therein have additional stock left in the notches to fill the void that would otherwise lie internally of each joint so that a totally solid joint is produced.

7. Structure according to claim 6 wherein each of said full notches in each of said slats is E-shaped to define said additional stock to fill the void that would otherwise be produced.

8. Structure according to claim 2 wherein each of said elongated structural members has a joint region and each of said joint regions has cut into it either no notch at all, a full notch, or a full notch with an orthogonal half-notch centrally cut into the side thereof, such that all of said elongated structural members have only one of the above-stated three configurations at the joint region.

9. Structure according to claim 6 wherein the elongated structural members of the X-dimensional array are all laths with a full notch at the joint region, all the elongated structural members of the Y-dimensional array are slats having at their joint region a full notch having a half-notch centrally cut into its side, and each pair of elongated structural members in the Z-dimensional array comprises both a first post with a full notch at the joint region and a second post with no notches at all.

10. Structure according to claim 1 wherein in the directions of said lattice other than said substantially elongated direction said lattice is substantially equidimensional.

11. Structure according to claim 10 wherein said structural support is for use substantially horizontally extended as a beam and is substantially elongated in the length dimension which is the direction of the run of the beam, and is also of depth dimension substantially greater than the width dimension.

12. Structure according to claim 11 wherein in the two directions in which said reticulated lattice is not elongated all structural members have a total of two joints.

13. Structure according to claim 1 in which some of said elongated structural members are in at least two parts having ends which meet at a butt joint within the framework of said lattice.

14. Structure according to claim 13 wherein said ends which meet at a butt joint are pinned to a contiguous elongated structural member for additional strength.

* * * * *

UNITED STATES PATENT AND TRADEMARK OFFICE
CERTIFICATE OF CORRECTION

PATENT NO. : 4,825,620

DATED : May 2, 1989

INVENTOR(S) : David W. Johnson

It is certified that error appears in the above identified patent and that said Letters Patent is hereby corrected as shown below:

Col. 7, claim 1, line 15 of the patent, change "substantially equal to two times the cross-sectional area of each of the three elongated members" to read, --of length substantially equal to twice the thickness of said structural members and of depth substantially equal to half the thickness of said structural members such that when paired with an aligned oppositely-directed full notch a pass-through opening for a pair of said structural members is defined--.

Signed and Sealed this

Sixteenth Day of July, 1991

Attest:

HARRY F. MANBECK, JR.

Attesting Officer

Commissioner of Patents and Trademarks